US007322096B2

(12) United States Patent
Biskeborn et al.

(10) Patent No.: US 7,322,096 B2
(45) Date of Patent: Jan. 29, 2008

(54) METHOD FOR FABRICATING MAGNETIC WRITE HEADS

(75) Inventors: Robert Glenn Biskeborn, Hollister, CA (US); Michael J. Doscher, Morgan Hill, CA (US); James Howard Eaton, Morgan Hill, CA (US)

(73) Assignee: International Business Machines Corporation, Armonk, NY (US)

( * ) Notice: Subject to any disclaimer, the term of this patent is extended or adjusted under 35 U.S.C. 154(b) by 164 days.

(21) Appl. No.: 11/172,465

(22) Filed: Jun. 29, 2005

(65) Prior Publication Data

US 2005/0235483 A1  Oct. 27, 2005

Related U.S. Application Data

(62) Division of application No. 10/354,834, filed on Jan. 29, 2003, now Pat. No. 6,947,256.

(51) Int. Cl.
*G11B 5/127* (2006.01)
*H04R 31/00* (2006.01)

(52) U.S. Cl. ............ 29/603.16; 29/603.15; 29/603.18; 29/417; 216/65; 360/122; 360/126; 360/317; 427/127; 427/128; 451/5; 451/41

(58) Field of Classification Search .......... 29/417, 29/603.13–603.16, 603.18; 360/122, 123, 360/126, 317; 427/127, 128; 451/5, 41; 216/65
See application file for complete search history.

(56) References Cited

U.S. PATENT DOCUMENTS

| 5,594,608 | A | * | 1/1997 | Dee | 360/126 |
| 5,640,753 | A | * | 6/1997 | Schultz et al. | 29/603.08 |
| 5,764,447 | A | * | 6/1998 | Lazzari | 360/318.1 |
| 5,920,762 | A | * | 7/1999 | Simmons et al. | 438/3 |
| 5,926,350 | A | * | 7/1999 | Chiu et al. | 360/121 |

* cited by examiner

*Primary Examiner*—Paul D. Kim
(74) *Attorney, Agent, or Firm*—Zilka-Kotab, PC

(57) ABSTRACT

A magnetic write head and method for bulk fabrication of the same are provided. A trench is formed in a nonmagnetic substrate. A first magnetically permeable layer is deposited in the trench of the substrate. An optional first insulating layer is deposited in the trench. A conducting circuit is defined in the trench. The conducting circuit creates the magnetic flux. An optional second insulating layer is deposited in the trench. Writer gaps are patterned and then a second magnetic layer is added over the second insulating layer. The substrate is divided to form individual write heads.

14 Claims, 9 Drawing Sheets

METHOD FOR FABRICATING MAGNETIC WRITE HEADS

RELATED APPLICATIONS

This application is a divisional of U.S. patent application Ser. No. 10/354,834, filed Jan. 29, 2003, now U.S. Pat. No. 6,947,256.

FIELD OF THE INVENTION

The present invention relates to magnetic write heads for writing to a magnetic storage media, and more particularly, this invention relates to flat profile write head design for writing magnetic transitions onto flexible magnetic storage media. One application is writing the patterns needed for timing-based servo, such as is used with the LTO (Linear Tape Open) standard. Another application is that for writing data in general.

BACKGROUND OF THE INVENTION

Servo control systems that maintain the position of a magnetic head relative to tracks in magnetic storage media are well known. European Patent Application EP 0 690 442 A2, published Jan. 3, 1995, entitled "Servo Control System", Albrecht et al., describes a servo control system having a magnetic recording head for writing servo position code across the width of the magnetic recording tape and down the length of the tape. The head also has multiple gaps in the down-the-tape direction. The head can write a pattern along the length of the tape wherein the pattern contains multiple gaps spaced across the width of the tape. The advantage of such a recording head is the ability to write servo code along the entire length of the tape in discrete areas (bands) across the entire width of the tape in a single pass. This increases position accuracy of one pattern with respect to another. This also provides an economic advantage because writing each band separately would be significantly more expensive.

As shown in FIG. 1, a typical prior art head 100 is fabricated from two parallel pieces of ferrite 110 separated by a layer of glass 120. The top surface of the ferrite-glass-ferrite head 100 is curved, defining the contact surface of the tape. This curved surface is covered first with a thin magnetic seed layer 140 and then later with a layer 130 of magnetic material several microns thick. Gaps 150 defining the writing pattern extend through the magnetic layer 130 to the seed layer 140 over the central glass region. A wire winding 160 with one or more turns passes through a groove 170 in the ferrite extending across the long axis of the head 100 next to the glass. Current passing through the wire 160 energizes magnetic fields in the gaps 150. The magnetic field writes the gap pattern on the passing tape (not shown). Contact between the passing tape and the head causes wear to the head thereby decreasing its life.

Using the prior art approach, each head 100 must be fabricated individually (i.e., discretely). The small size and shape of the discrete heads makes it difficult to apply a photoresist layer that has a uniform thickness. Forming a uniform photoresist layer is an especially important consideration because the photoresist is used to pattern the recording gaps. Photoresist thickness non-uniformity directly and adversely affects the quality of the patterns, especially for narrow gap dimensions. Such patterns require the formation of narrow lines (on the order of 1.5 µm). Also, because the surface is curved, one must compensate for the curvature of the head in the photolithographic process. It is particularly difficult to apply an even layer of photoresist to pattern the recording gaps on this curved surface. Applying resist by spinning is difficult in the case where the length-to-width ratio of a part is far greater than unity. Although resist can be dipped or sprayed onto the part, these methods are cumbersome and have not been refined for submicron geometric tolerances. Nor have they been efficiently adapted to fabrication of an array of heads.

To produce this rounded shape, the heads must be individually machined although they could be produced in bar form to reduce fabrication costs. FIG. 2 illustrates a bar 200 containing several heads 100. Lines 210 perpendicular to the long axis indicate where the bars could be sawed apart to form individual heads 100. Although the bars 200 can be cut up into several heads 100, the procedure is still not very efficient and provides identical or even more difficult challenges to achieving photoresist uniformity. Thus, it can be seen that multiple gap servo write heads are expensive to manufacture and have limited servo pattern definition.

Another prior art approach attempts to solve the problem of producing the servowriter heads individually. This approach is described in U.S. Pat. No. 6,018,444. According to the process, existing wafer processing techniques are used for batch operation of head production. FIG. 3 is a drawing illustrating a cross section of a servo write head 300 with recording tape 310 passing over the head 300 according to the prior art. The tape 310 first contacts the head 300 on the curved surface 320 located at the leading edge of the head 300. Tape 310 continues over the flat surface 330 supported by an air bearing which has formed between the tape 310 and the head surface 330. The tape 310 continues to the opposite edge of the head, exiting the head over a trailing curved edge 350 similar to the entrance. The tape passes over the rounded edges and proceeds over the flat portion 330 of the head 300 separated from the surface by a thin air bearing. A spacer 340 region has a non-magnetic material (such as glass) that separates two pieces of ferrite 360. External inductive coil windings 160 are wrapped around either side of bottom portion 370 of head 300 to create the magnetic flux.

One drawback to this approach is that it relies on an air bearing surface for wear resistance. Further, the prior art air bearing must be tailored to the tape velocity. Small head-tape spacing is preferred for good pattern transfer. Because the presence of an air bearing surface can cause write errors, the air bearing for the head 300 in FIG. 3 must be tailored to the tape velocity. Another disadvantage of the prior art process is the difficulty in manufacture and assembly due to its multi-component design, curved shape, and wire winding.

Therefore, an unresolved need exists for a batch fabrication technique that will increase the manufacturing efficiency of servo write heads and also improve servo pattern definition for fine features while reducing head wear.

A further need exists for a one-piece construction not using an external winding, thereby simplifying the assembly process. What is also needed is a head that does not rely on an air bearing for wear resistance, but rather has a flat contour and a sharp air-skiving edge that result in contact recording which is insensitive to tape velocity. Yet another need exists for a batch fabrication technique that allows manufacture of an array of heads.

SUMMARY OF THE INVENTION

A magnetic write head and method for bulk fabrication of the same are provided. According to the method for manufacturing magnetic write heads for magnetic tape recording, a plurality of trenches are formed in a nonmagnetic substrate wafer, preferably, a ceramic wafer. A first magnetically permeable layer is deposited in the trench. A first insulating layer is optionally deposited on the first magnetically permeable layer. A conducting circuit is defined on the first insulating layer such as by lithographically defining the circuit. The conducting circuit creates the magnetic flux. A second insulating layer is deposited in the trench such that the conducting circuit is enclosed between the first and second insulating layers. The wafer can be planarized down to about the original surface level of the wafer. A pattern of write head gaps is defined, and a second magnetic layer is added over the second insulating layer. The wafer is machined to form individual write heads. Skiving edges are formed on the air skiving side or sides of the trench. The skiving edges scrape off air that otherwise would increase the thickness of the air bearing between the head and a tape passing thereacross.

A magnetic write head created by the process set forth above thus comprises a nonmagnetic substrate having a trench, a first magnetically permeable layer positioned in the trench, a first insulating layer in the trench, a conducting circuit for creating a magnetic flux, a second insulating layer, a write heads pattern, and a second magnetic layer.

In a further embodiment, multiple magnetic head elements are fabricated in a planar two-dimensional array, in which individual head elements can be used to write adjacent tracks of magnetic media. The resulting tight head element pitch gives lower total span of elements in the head and this ultimately gives higher track pitch capability by minimizing the misregistration resulting from tape dimensional changes. This design is needed for high TPI in tapes having hygroscopic expansions, etc. The current carrying conductor for each head element in this embodiment may be a coiled structure. This represents a major departure from conventional tape head design.

For the servo writer head, the conducting circuit may follow a shape of the write gaps pattern. Thus, the conducting circuit may be straight or curved and/or can lie directly beneath the write gaps pattern. In one embodiment, the second magnetic layer extends over the substrate to the skiving edges. However, it may be preferable to have the second magnetic layer recessed and flush with the top of the substrate, depending on the tape characteristics. This prevents the tape from wearing the trench materials. Preferably, the tape-engaging surface of the second magnetic layer is flush with the tape-engaging surface of the substrate, such that the tape slides across a flat contour and the skiving edges are cut only in the substrate. Also preferably, the skiving edges are sharp and typically have about 90 degree walls. Sharp edges, coupled with the flat contour of the head, result in a contact recording which is relatively insensitive to tape velocity. This in itself provides a significant advantage over the prior art. A design variation for TBS writing has pairs of write gaps in tandem with one or two additional independently-addressable gaps. This design makes it possible to eliminate the effect of velocity variation during writing the servo patterns.

The problems solved and advantages of the invention as applied to the data- and servo-writer heads are many. The fabrication method may make use of wafer processing equipment and techniques (conventional servo writer heads are built using complicated and specialized processes). The method provides batch processing for efficient, low cost production. The head itself is a simplified mechanical assembly having hard, non-magnetic wear-resistant edges for long head life. The head further provides low electrical impedance, which allows for higher writing frequency and thus higher tape speed. The velocity-insensitive flat profile enhances this capability by allowing higher writing speeds.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

BEST MODE FOR CARRYING OUT THE INVENTION

The following description is the best embodiment presently contemplated for carrying out the present invention. This description is made for the purpose of illustrating the general principles of the present invention and is not meant to limit the inventive concepts claimed herein.

Figure 1:
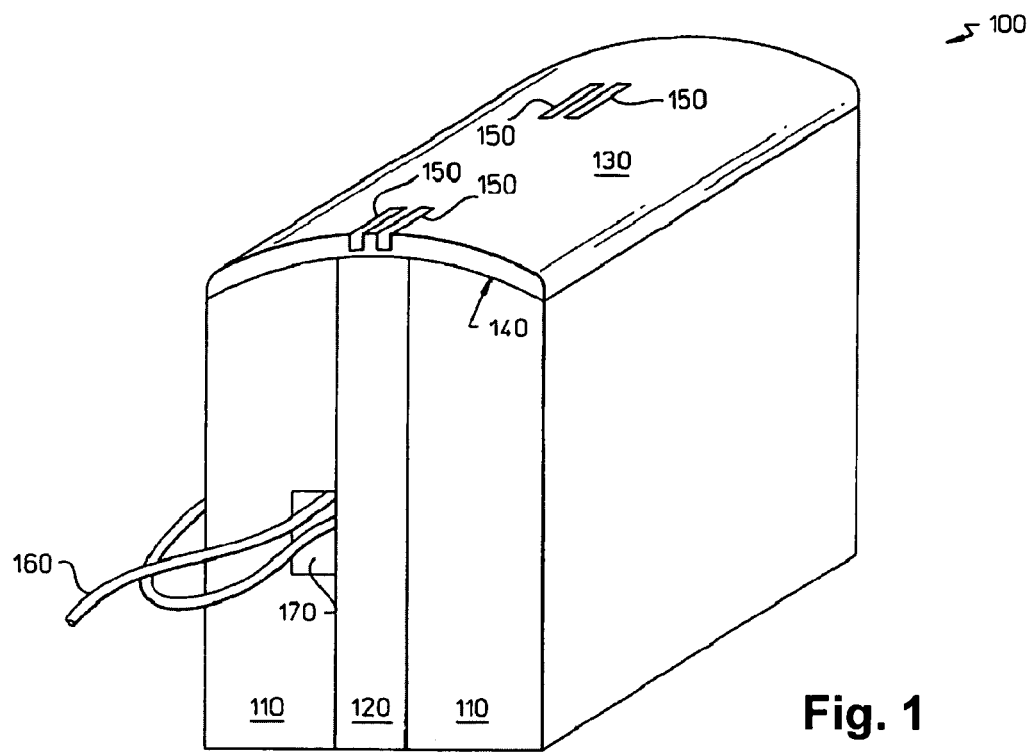
FIG. 1 is a drawing illustrating a prior art ferrite-glass-ferrite head used for writing position servo information on magnetic tape.
Figure 2:
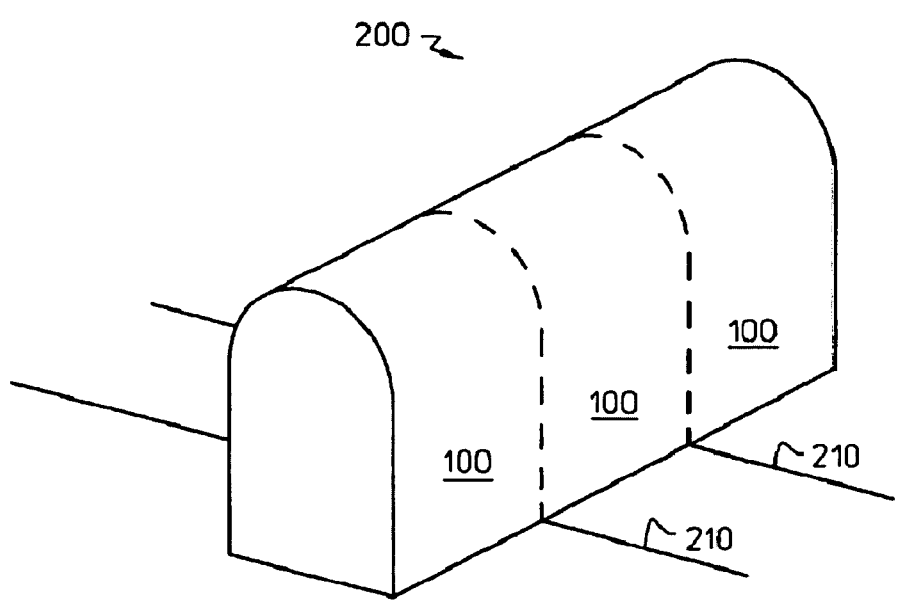
FIG. 2 is a drawing illustrating a bar containing several servo write heads similar to those of the prior art, with lines perpendicular to the long axis indicating where the bars could be sawed apart to form individual heads.
Figure 3:
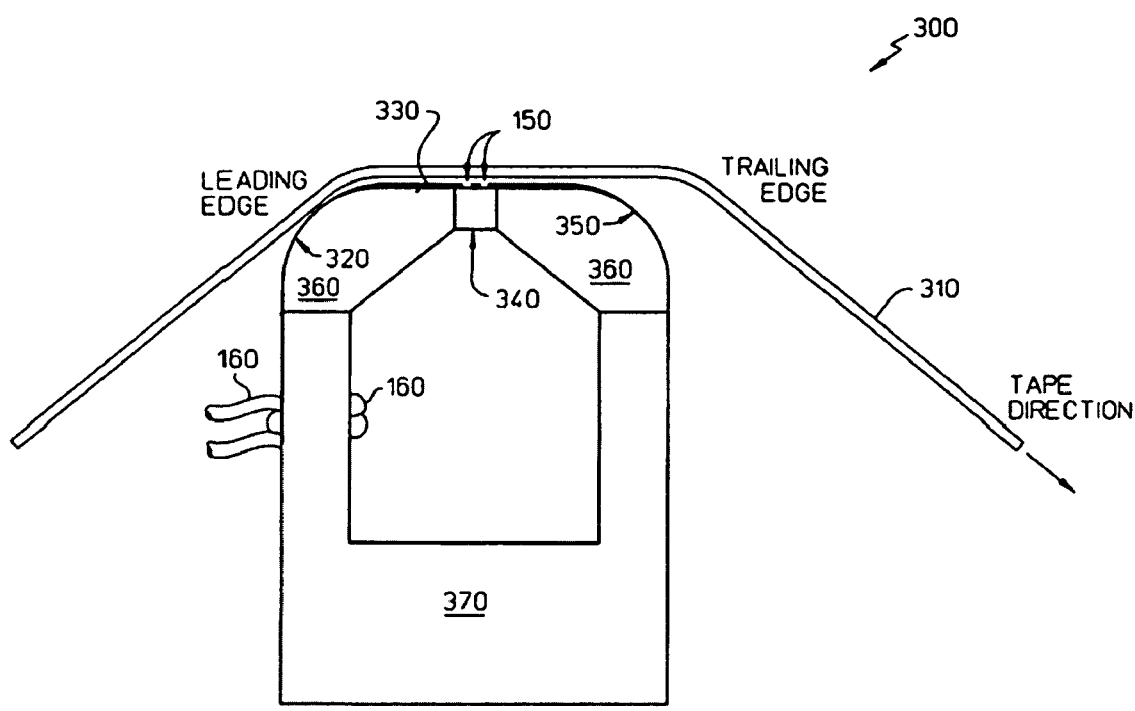
FIG. 3 is a drawing illustrating a cross section of a prior art servo write head.
Figure 4:
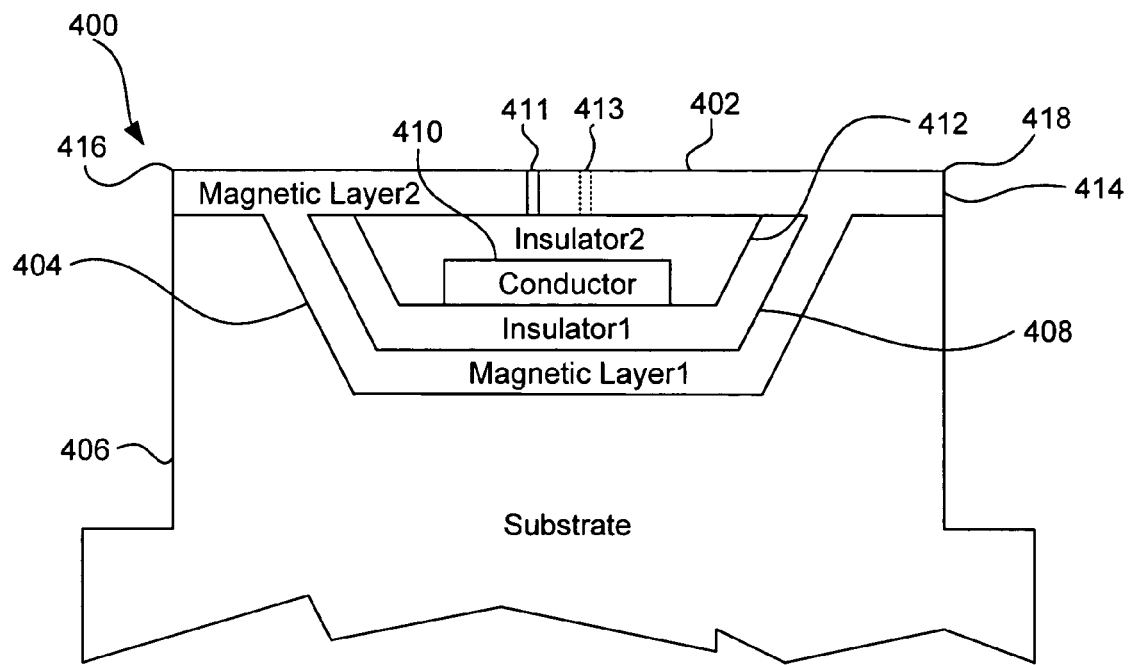
FIG. 4 is a cross sectional view of a magnetic write head for writing TBS patterns according to one embodiment.

FIG. 4 illustrates a magnetic write head 400 for which the signal flux emerges from the plane 402 of the head, rather than from a cut and lapped edge. As shown, a first magnetically permeable layer 404 is positioned in a trench of a nonmagnetic substrate 406. An optional first insulating layer 408 is positioned on the first magnetically permeable layer. A current-carrying conducting circuit 410 for creating a magnetic flux is positioned on the first insulating layer 408 (or the first magnetic layer if no first insulating layer 408 is present). The conducting circuit 410 can be a single wire patterned below a data or servo write gap 411 pattern. The conducting circuit can also be a multi-turned-type wire. The conducting circuit 410 may follow the layout of the write gap pattern along the head. Thus, the conducting circuit 410 may be straight or curved and/or can lie directly beneath the gap pattern.

An optional second insulating layer 412 encloses the conducting circuit 410 between the first and second insulating layers 408, 412. A second magnetic layer 414 is positioned on the second insulating layer 412.

One or more write gaps 411 extend through the second magnetic layer 414. Note optional write gap 413 (in shadow), which forms a servo write gap pattern with write gap 411. When a current is passed through the conducting circuit 410, a magnetic flux is created through the second magnetic layer 414 and across the write gap 411. The flux that bridges out of the gap in turn writes data to the tape.

The second magnetic layer 414 has a high magnetic permeability, and so the magnetic flux generated by the conducting circuit 410 is concentrated in the second magnetic layer 414. The second magnetic layer 414 is preferably a high magnetic moment material. The second magnetic layer 414 as shown in this embodiment extends to the skiving edges 416, 418.

As mentioned above, the insulating layers 408, 412 are optional, and need not be present in all embodiments.

Figure 5:
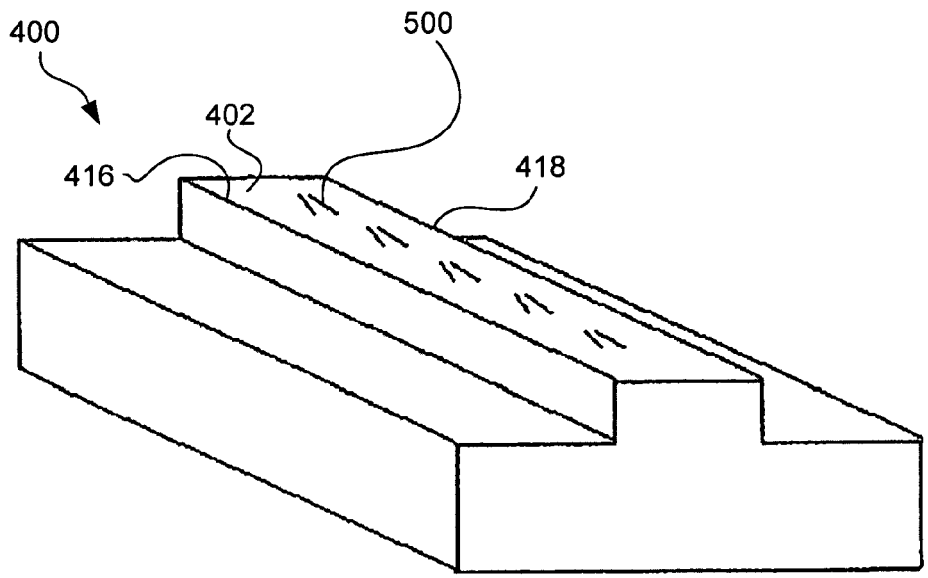
FIG. 5 is a perspective view of the write head of FIG. 4.
Figure 6:
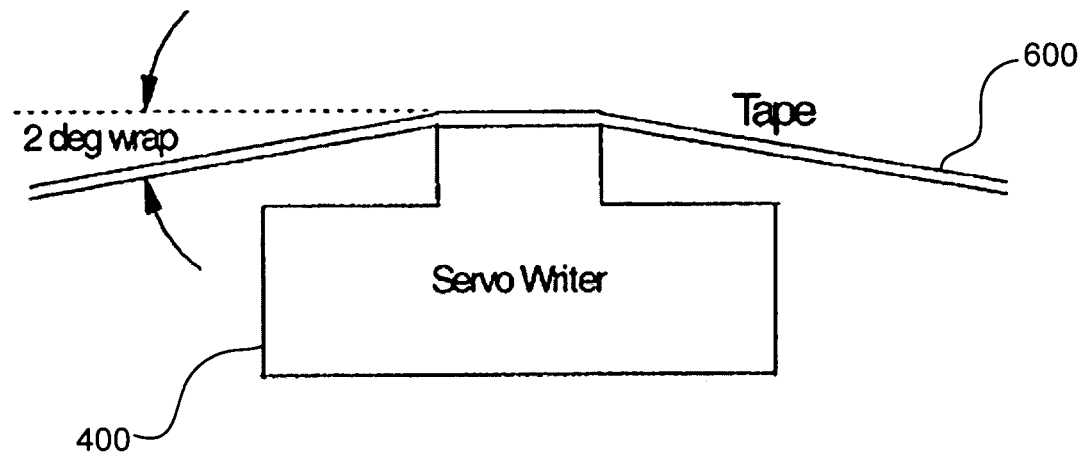
FIG. 6 illustrates the write head in use.

FIG. 5 is a perspective view of the write head 400 showing an illustrative servo write gap pattern 500. Note that the write gap pattern 500 may be arranged as needed for writing LTO TBS patterns, or modifications thereof. FIG. 6 illustrates the write head 400 in use. The tape 600 is driven over the write head 400 by a drive mechanism (not shown). Write electronics (not shown) are coupled to the magnetic write head for controlling the voltage in the conducting circuit 410 of the magnetic write head, and thereby, the magnetic flux.

The spacing between the flat portion of the write head 400 and the tape 600 is affected by the choice of wrap angle, tape speed and tape characteristics. Small head-tape spacing (preferred for good pattern transfer) is maintained by minimizing the amount of air that is entrapped between the tape 600 and the leading edge of the write head 400. As the tape 600 moves over the leading skiving edge, most of the air that clings to the tape 600 is prevented from being carried into the region between the tape 600 and the plane 402 of the write head 400. Thus, the sharp edges 416, 418, coupled with the flat contour of the write head 400, provide essentially a contact recording and the contact is relatively insensitive to changes in tape speed. This in itself provides a great advantage over the prior art. Due to the thin film structure, the write head 400 has a low inductance flux path, which facilitates writing of sharp transitions.

As shown in FIG. 6, the tape 600 preferably wraps the skiving edges 416, 418 by between 0.5 and 5 degrees, and ideally 0.8 to 2 degrees, depending on the length of the tape bearing surface in the direction of tape travel and depending on the tape characteristics.

Figure 7:
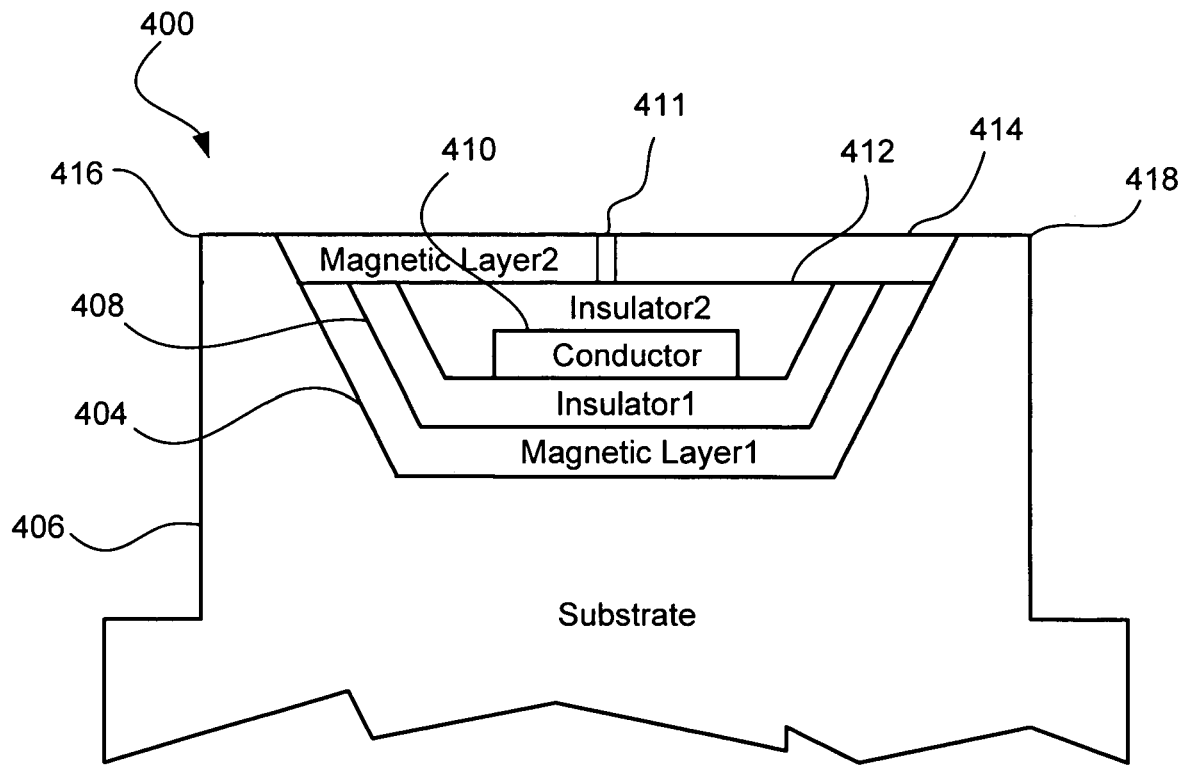
FIG. 7 is a cross sectional view of a write head according to an embodiment.

FIG. 7 depicts an alternate embodiment of the write head 400, in which the skiving edges 416, 418 are fashioned in the hard substrate material away from the trench formed in the substrate and second magnetic layer. Ideally, the skiving edges 416, 418 lie on substantially the same plane as the surface of the write head 400. The flat contour of the write head 400 and sharp skiving edges 416, 418 fabricated from the substrate material minimize wear of the trench materials.

The above thin film configuration provides the following advantages: efficient magnetic design with low flux leakage due to concentrating the flux source in immediate proximity to the write gaps; low inductance design; and it provides the option of tailoring the conductor resistance for optimizing rise time.

In use, the flat profile write head can be used to write timing based servo patterns in Linear Tape-Open (LTO) and other tape recording media. LTO exists in two different formats, one for fast data access and another for greater storage capacity. The Accelis format uses 8 mm-wide tape on a two-reel cartridge that loads at the mid-point of the tape to provide fast data access, specifically for read-intensive applications, such as online searches and retrieval functions. The Ultrium format uses a single reel of half-inch wide tape to maximize storage capacity, specifically for write-intensive applications, such as archival and backup functions.

Figure 8:
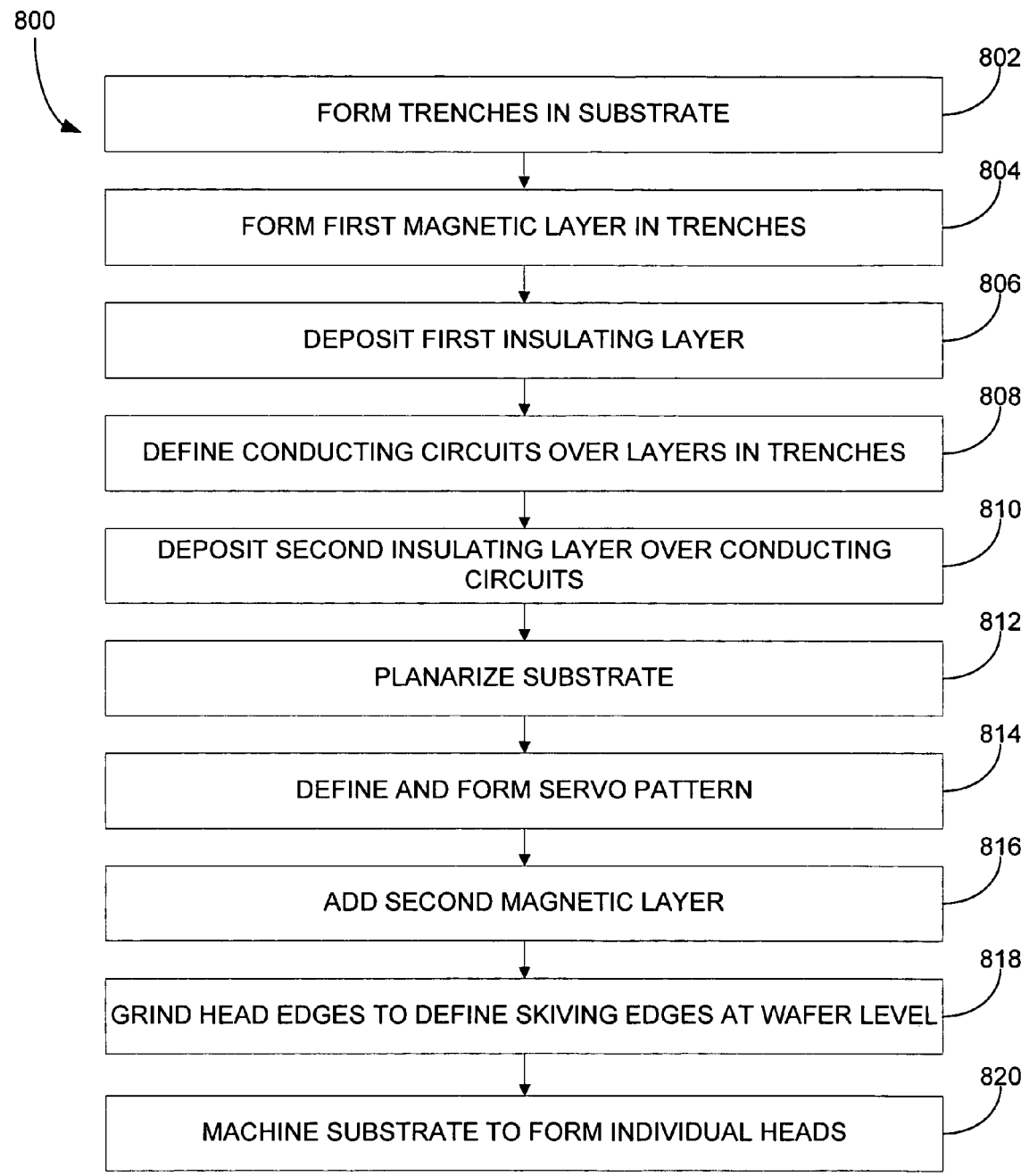
FIG. 8 is a flow diagram of a process for bulk manufacture of write heads for magnetic tape.

FIG. 8 depicts a process 800 for bulk manufacture of magnetic write heads 400 for magnetic tape according to one embodiment. In step 802, a plurality of trenches are machined or etched in a nonmagnetic substrate 406, preferably a ceramic substrate wafer to provide high wear resistance. In step 804, a first magnetically permeable layer 404 is deposited in each trench of the substrate 406, such as by blanket deposition. A first insulating layer 408 is optionally deposited on the first magnetically permeable layer in step 806, again such as by blanket deposition. In step 808, a conducting circuit 410 is defined on the first magnetic layer, or the first insulating layer 408 if present, such as by lithographically defining the conducting circuit 410. The conducting circuit 410 creates the magnetic flux. In step 810, a second insulating layer 412 is deposited in the trench such that the conducting circuit 410 is enclosed between the first and second insulating layers 408, 412. Again, the second insulating layer 412 may be blanket deposited. Next, in step 812, the wafer is chem-mech planarized. In step 814, a servo or data write gap pattern is defined and the desired servo writer pattern is lithographically defined above the conductor. Note that the conducting circuit 410 can be straight and can lie directly beneath the servo pattern 500. Alternatively, the circuit 410 can be shaped to minimize resistance drops, and/or can be customized to accommodate the specific servo pattern 500.

In step 816, the second magnetic layer 414 is deposited. In the embodiment shown in FIG. 4, the wafer is planarized down to about the original surface level of the wafer (or other desired level), leaving the deposited layers in the trenches. The second magnetic layer 414 is added over the second insulating layer 412, such as by plating. As an option, a high wear-resistant magnetic layer can be deposited for extended head life after the writer pattern is created.

In the embodiment shown in FIG. 7, the second magnetic layer 414 is deposited in the trench and the wafer is planarized to about the original surface level of the wafer.

This process creates a multiplicity of one-piece heads 400 on the wafer. In step 818, the head edges are ground to define skiving edges 416, 418 and the tape bearing surface. In step 820, the wafer is machined to form the individual heads 400.

Note that the order of the steps for this process may be changed, and steps may be added or omitted, depending on the desired result.

Figure 9:
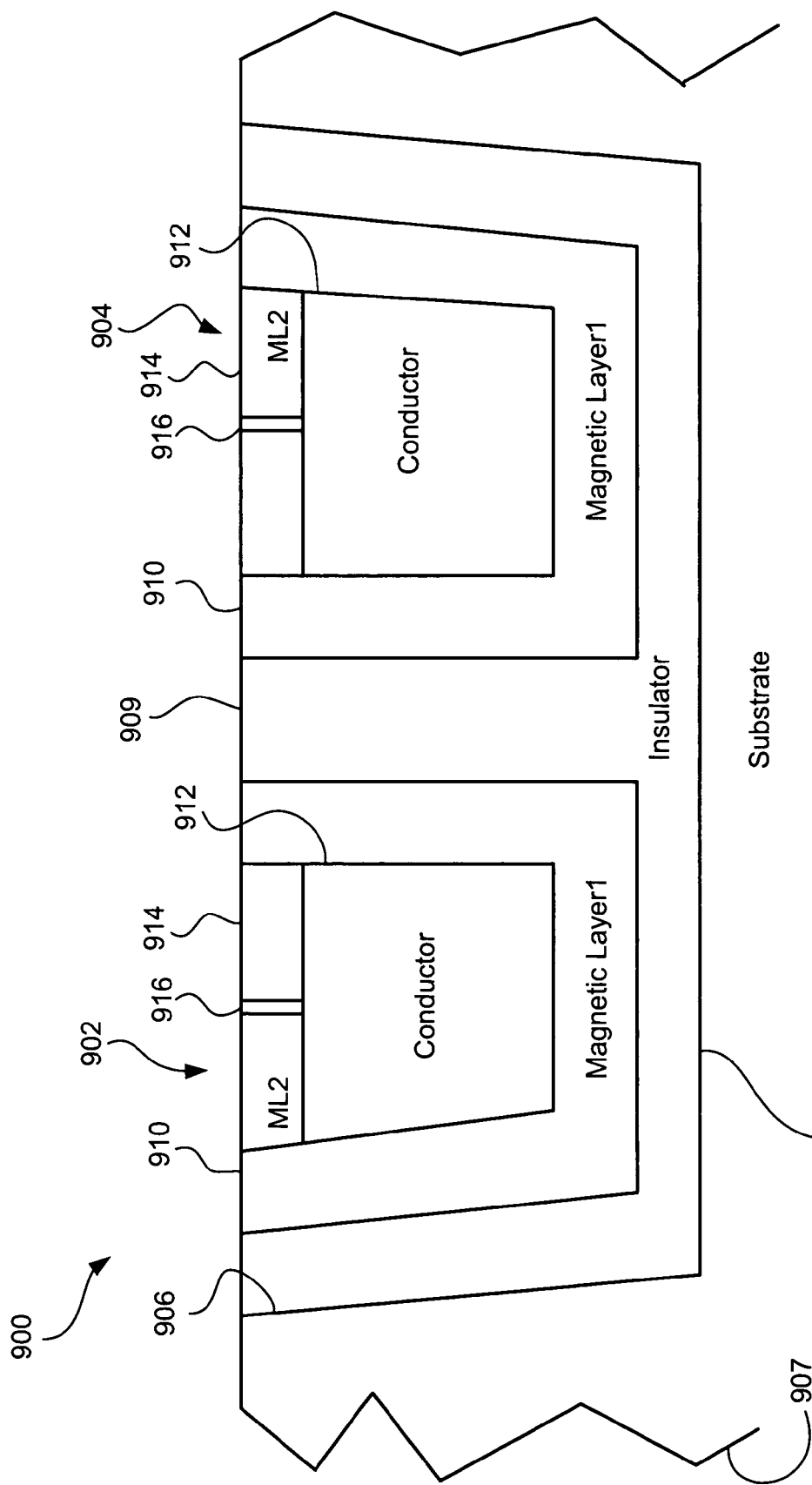
FIG. 9 illustrates a servo writer write head with tandem head element pairs according to one embodiment.

A variation of the process 800 of FIG. 8 can be used to build data write heads fabricated in a planar two-dimensional array, in which individual head elements write adjacent tracks. FIG. 9 illustrates a data write head 900 with multiple head elements 902, 904. As shown, a trench 906 is defined in a wafer substrate 907. An insulating layer 908 with two pockets is positioned in the trench. In each pocket, separated by an insulating wall 909, a first magnetic layer 910, a conductor 912, one or more write gaps 916, and a second magnetic layer 914 are formed.

Figure 10:
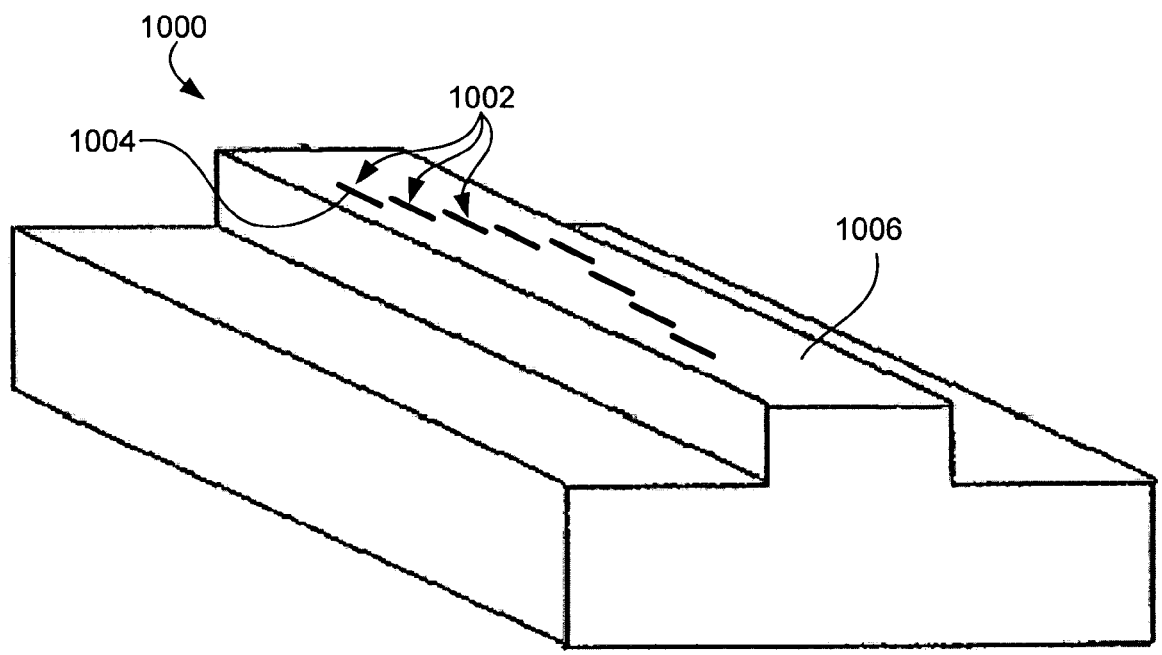
FIG. 10 is a perspective view of a writer head according to one embodiment.

FIG. 10 shows a writer head 1000 in which individual head elements 1002 can simultaneously write multiple adjacent tracks on the tape. This head 1000 is preferably similar in structure to the head 900 shown in FIG. 9. As shown in FIG. 10, the gaps 1004 are aligned in a staggered formation to accommodate the necessary conducting circuits (which run parallel under the tape bearing surface 1006), while being positioned close enough together to write very closely positioned tape tracks.

The current carrying conductor for each head element in this embodiment may be a horizontally or vertically constructed coiled structure. The resulting reduction in head element pitch compared to conventional disk heads allows adjacent track writing. This design is desirable for simultaneously writing, for example, 8 or more ~1 micrometer wide tracks to avoid misregistration caused by tape lateral expansion or contraction. This represents a major departure from conventional tape head design.

Figure 11:
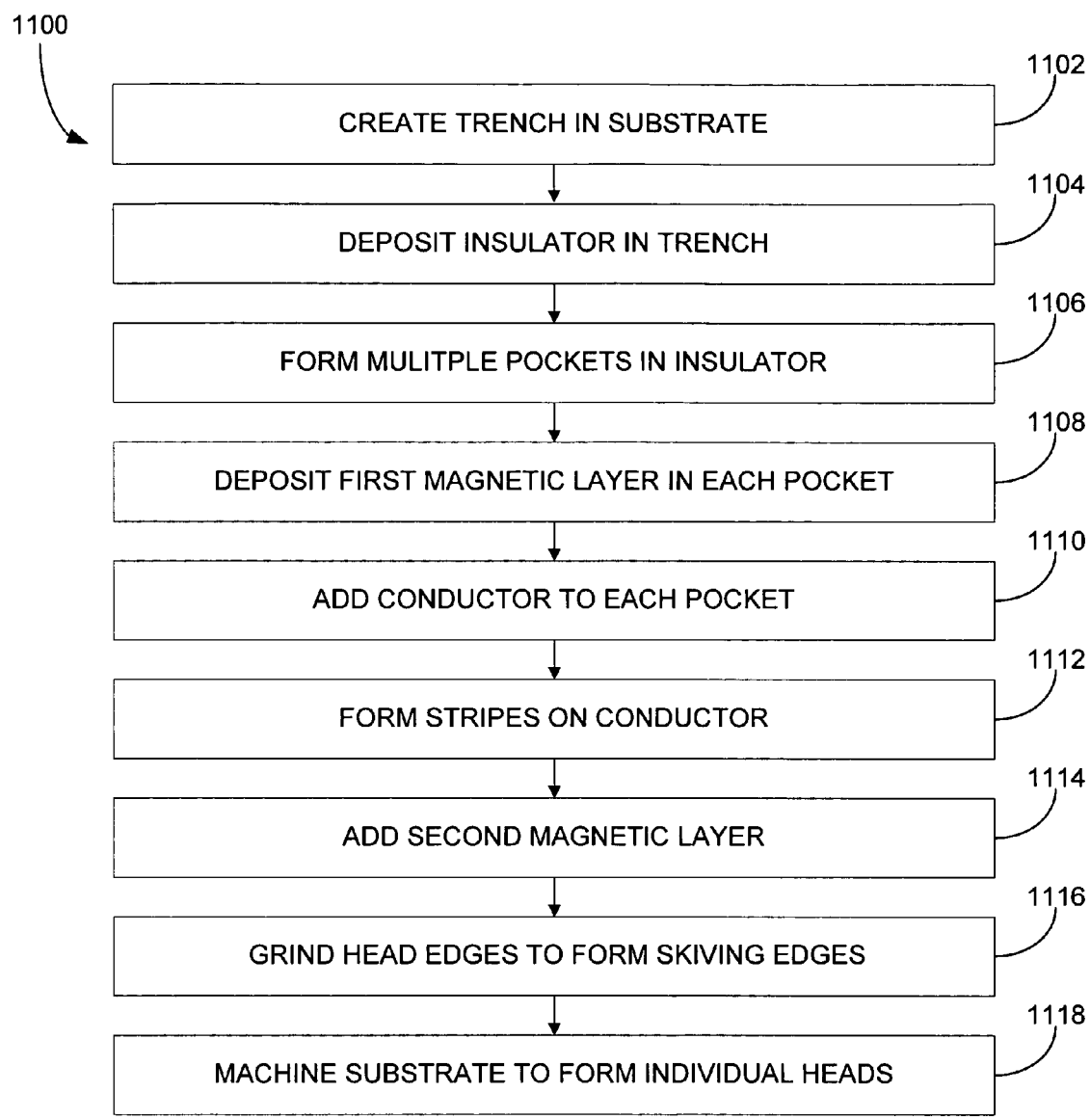
FIG. 11 is a flow diagram of an illustrative process for fabricating a write head with multiple head elements.
Figure 12:
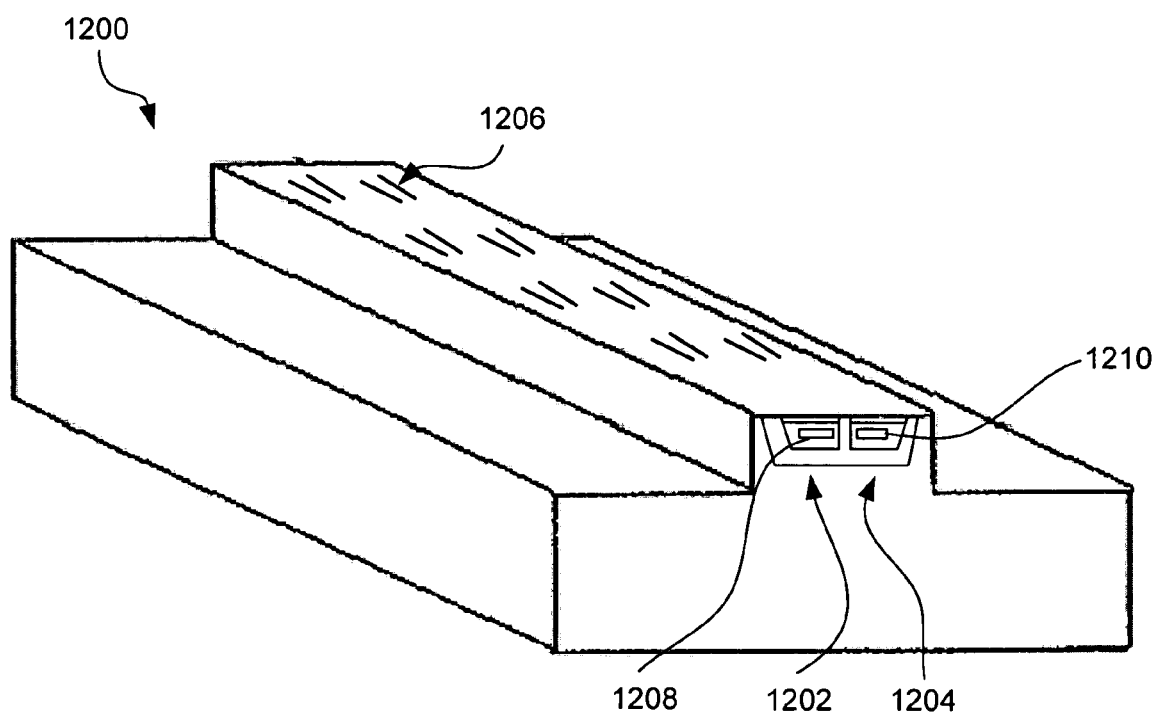
FIG. 12 depicts a servo writer head constructed using the process of FIG. 11.

FIG. 11 depicts an illustrative process 1100 for fabricating a write head with multiple head elements, such as those shown in FIGS. 9, 10, and 12. In step 1102, a 240 micron wide, 25 to 35 micron deep, trench is created in the substrate, which can be formed of N58 ($AL_2O_3$—TiC). In step 1104, a 35 micron layer of alumina (insulator) is deposited on the substrate and lapped back to about the original surface of the substrate. 20 micron deep pockets are patterned and etched in the alumina in step 1106. A 5 micron thick layer of permalloy (first magnetic layer) is plated in each pocket in step 1108. Note that steps 1104-1106 and step 1108 maybe reversed.

In step 1110, a 15+ micron layer of copper (conductor) is plated to the permalloy in the pocket and lapped. In step 1112, the copper is patterned and etched to leave 4 micron high servo stripes in the desired servo pattern. In step 1114, a 4+ micron layer of NI-FE (second magnetic layer) is sputtered over the deposited material and lapped.

This process creates a multiplicity of one-piece heads 900 on the wafer. In step 1116, the head edges are ground to define skiving edges and the tape bearing surface. In step 1118, the wafer is machined to form the individual heads 900.

The process of FIG. 11 can be adapted to produce several heads/head elements in one trench and/or several trenches with one or more heads/head elements formed in each trench.

FIG. 12 depicts a servo writer head 1200 constructed using the process of FIG. 11. This head 1200 is preferably similar in structure to the head 900 shown in FIG. 9. As shown, the head 1200 has two head elements 1202, 1204, each head element 1202,1204 having a write gap 1206 pairs. The conductor 1208 of the first head element 1202 is used to energize the write gaps 1206 of the first head element 1202. Similarly, the conductor 1210 of the second head element 1204 is used to energize the write gaps 1206 of the second head element 1204. This arrangement can be used to write LTO servo patterns that are compatible with the present LTO servo patterns but which avoid error created by tape velocity variation during servo pattern writing.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for bulk fabrication of magnetic write heads for magnetic tape, comprising:
   forming a substrate having a trench;
   depositing a first magnetic layer in the trench of the substrate;
   defining a conducting circuit in the trench, the conducting circuit being for creating a magnetic flux;
   defining at least one write gap;
   adding a second magnetic layer; and
   dividing the substrate for forming individual write heads.

2. The method as recited in claim 1, wherein the conducting circuit is lithographically defined.

3. The method as recited in claim 1, wherein the conducting circuit follows a predefined write gap pattern.

4. The method as recited in claim 1, and further comprising forming a skiving edge on at least one side of the trench, the skiving edge being for scraping air from a tape passing thereacross.

5. The method as recited in claim 4, wherein the second magnetic layer substantially extends to the skiving edge.

6. The method as recited in claim 4, wherein the second magnetic layer does not extend to the skiving edge.

7. The method as recited in claim 4, wherein the skiving edge is approximately orthogonal to a plane extending across the tape-bearing surface of the head.

8. The method as recited in claim 1, wherein the at least one write gap includes a pair of servo write gaps.

9. The method as recited in claim 1, and further comprising defining at least one additional conducting circuit in the trench for forming at least one additional independently energizeable head element in a planar two-dimensional array.

10. The method as recited in claim 9, wherein each of the conducting circuits is defined towards a desired location of the write gaps.

11. The method as recited in claim 9, wherein the conducting circuit in each head element is a coiled structure.

12. The method as recited in claim 1, and further comprising depositing an insulating layer on the first magnetic layer.

13. The method as recited in claim 1, and further comprising depositing an insulating layer on the conducting circuit between the conducting circuit and the second magnetic layer.

14. The method as recited in claim 1, further comprising forming an insulator in the trench, forming pockets in the insulator, and wherein the first magnetic layer and conducting circuit are positioned in the pockets in the insulator.

* * * * *